AUTOMATIC TELEGRAPHIC SIGNAL GENERATOR

Filed March 6, 1968 2 Sheets-Sheet 1

INVENTOR
ROBERT W. THOMPSON
BY Weir, Marshall MacRae & Lamb.
PATENT AGENT

AUTOMATIC TELEGRAPHIC SIGNAL GENERATOR

INVENTOR
ROBERT W. THOMPSON
BY Weir, Marshall MacRae & Lamb.
PATENT AGENT

United States Patent Office 3,530,240

Patented Sept. 22, 1970

3,530,240
AUTOMATIC TELEGRAPHIC SIGNAL GENERATOR

Robert W. Thompson, Toronto, Ontario, Canada, assignor to Computing Devices of Canada Limited, Ottawa, Ontario, Canada Filed Mar. 6, 1968, Ser. No. 711,060
Int. Cl. H04l 23/00
U.S. Cl. 178—17 4 Claims

ABSTRACT OF THE DISCLOSURE

Apparatus for generating a telegraphic signal, representing a message format, having at least one message preparation position with at least one keyboard connected to a programming unit which generates the message format signals required by each keyboard. Switches are preselected on each keyboard for the required format and with actuation of a starting or scanning switch on a keyboard the programming unit searches for and is connected to that keyboard and generates in the correct order the signals according to the preselected switches.

CROSS-REFERENCE TO RELATED APPLICATION

This invention is related to or is an improvement on the invention of copending United States patent application Ser. No. 381,869, now Pat. No. 3,361,875, of Stephen S. Banfalvi et al., filed July 10, 1964.

BACKGROUND OF THE INVENTION

The invention is for an improved apparatus for use in a code telegraph system, and in particular the invention relates to an apparatus for automatically generating the code telegraph signals for the format of a telegraph message. Telegraph systems using a code, for example a five unit pulse code, to represent each letter of the alphabet and various other symbols, are well known. These systems are sometimes referred to as "Teletype" systems. Such a system may include a telegraph typewriter apparatus having a keyboard somewhat similar to a typewriter keyboard which generates a series of code pulses in response to the actuation of a respective key, a telegraph printing apparatus for receiving the code pulses and printing the corresponding letter or symbol, and an exchange for interconnecting the desired transmitting and receiving apparatus. The growth of the systems resulted in complex networks, and to facilitate the routing and handling of messages over the complex networks automatic computer controlled exchanges were developed. These automatic exchanges are well known and may comprise a computer which recognizes various priority and routing letter combinations in the format of a message and makes the necessary connections for the proper handling and routing of the message. Absolute accuracy in the message format is essential if the message is not to be delayed, mis-routed or lost.

The apparatus described in aforementioned United States application Ser. No. 381,869 generates a message format in response to an operator depressing appropriate switches. The apparatus ensures the format signals are generated correctly and in a sequence required by the automatic exchange. The apparatus includes a keyboard which has a plurality of groups of switches with a plurality of switches in each group. Each switch controls a pulse code generator for generating a particular pulse code signal. Eaøh of the groups of switches represents a signal which must appear in a message format, and each switch in a group represents alternative choices of the signals for that group. Each group of switches is energized by a sequence generator in a predetermined sequence for the operator to make his selection, so that the message format signals are in the proper order. For example, one group of four switches might represent four alternate precedence signals, and another group of four switches might represent four alternate language media signals. The sequence generator will energize the precedence group of switches and this will be indicated by the illumination of those four switches. The operator depresses the appropriate switch for the desired precedence signal and the pulse code generator begins to generate the signal. All the switches are de-energized to prevent a further selection during generation. The operator waits until the signal generation for precedence has been completed, the sequence generator energizes the language media group, and the four switches in the language media group are illuminated. The operator depresses the appropriate switch and waits for the respective signal to be generated. This continues until the format has been completed.

It will be apparent that, while the apparatus generates a message format in the correct order and with no errors in the generated signals, the apparatus does not operate as efficiently as it might. The apparatus must wait for the operator to make each selection, and once the operator makes a selection the operator must wait until the apparatus finishes that signal before the operator can make the next selection. Further, the apparatus remains idle while the actual message is being typed because it is difficult to use such an apparatus to serve two or more operators.

SUMMARY

The present invention provides an apparatus for generating a message format where an operator does not have to wait between the actuation of one switch and the next. The operator makes all the necessary selections on the keyboard and then actuates the apparatus which scans the keyboard and generates the selected signals in the correct order. The present invention provides an apparatus which is not idle between the generation of one portion of the message format and the next, waiting for the operator to make the next selection. The apparatus is able to serve not only one but two or more operators. The apparatus serves a plurality of operators on a time sharing basis.

Thus the apparatus of the invention comprises at least one keyboard having a single first switch, a plurality of groups of second switches with a plurality of switches in each group, a group of third switches, an error indicator, and a programming unit having an electrical connection means to each keyboard. Each group in the group of second switches represents a signal which is part of the message and each switch represents an alternate signal item in its group. The programming unit includes a scanner responsive to the actuation of a first switch at one of the keyboards to scan the connections to the keyboards and make electrical connection to a keyboard which has a first switch actuated, and an error detection means electrically conected to the first scanner to determine (a) that at least one switch is actuated in each group of the groups of second switches, and (b) that each group of switches in the groups of second switches has no more than one switch actuated. If (a) and (b) are not met the error indicator in the particular keyboard is actuated, and if (a) and (b) are met a gate signal is produced. The programming unit also includes a gate opened by the gate signal to provide an electrical circuit between the first scanner (and the keyboard to which it is connected), a second scanner and a memory which has stored therein a word or words for each switch in the group of switches representing a telegraphic code signal. The second scanner scans the memory in a predetermined order and reads out words corresponding to switches actuated at the particular keyboard. An output means receives the words read from the memory and provides them as a telegraphic signal representing a message format to the keyboard which is connected to the programming unit.

In another embodiment the error detection circuit also checks that at least one switch in the group of third switches is actuated. If not it provides an error signal as before.

DESCRIPTION OF THE PREFERRED EMBODIMENT

Figure 1:
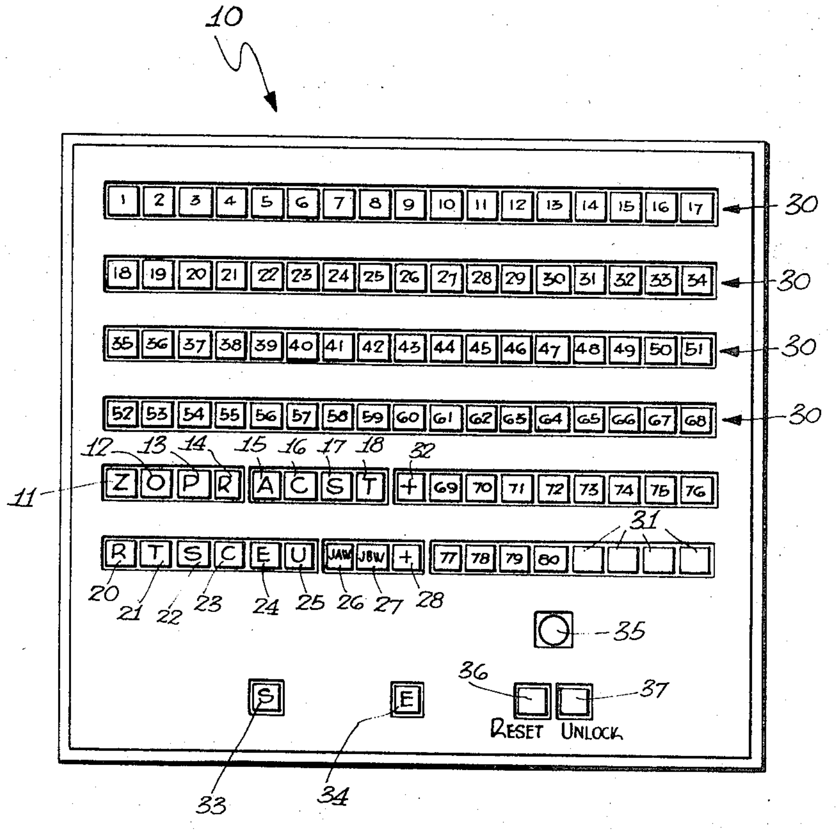
FIG. 1 is a plan view of a typical keyboard for use in the apparatus according to the invention.

The keyboard shown in FIG. 1 is suitable for use in apparatus of this invention for the generation of a message format as is required by the automatic exchange or exchanges in a particular system. Various systems are in use in different parts of the world, and it will become apparent that the apparatus described could be adapted to generate the code signals for the message formats required by other exchanges and systems.

The keyboard of FIG. 1 with the associated apparatus are for use in a system which requires the messages to have a message format as indicated below with the contents in the order indicated below.

(a) Format.—Precedence—Language media—Classification—Content indicator—Originator—Station serial number—Julian date—Time of filing message—Classification redundancy—Addressee (routing indicators)—End of routing signal
(b) Text
(c) End of Message Referring now to FIG. 1, a keyboard 10 is shown as would be suitable for the embodiment of the apparatus to be described. The keyboard 10 has a number of switches which have a rest position and an actuated position. The switches shown are push button switches and the majority when actuated by an operator lock in the actuated position until released. The push buttons are pushed or depressed to actuate the switch and they lock in the depressed actuated position. They are released either by pushing or depressing a second time or by an automatic release signal as will be mentioned hereinafter. Each switch preferably contains a light which illuminates it and the majority of switches are connected to be illuminated while they are in the actuated condition. Unless otherwise described, the switches on keyboard 10 will be assumed to be of the push-to-actuate, push-to-release type which are illuminated in the actuated position.

Keyboard 10 has several groups of switches which will be described below. Each group represents a part of a message format and each switch in a group represents an alternate signal item in that group.

Keyboard 10 has a group of switches 11–14 which bear respective indicia Z, O, P and R. This group of switches may be referred to as the precedence group and represents four alternate precedence levels which a message may have. The levels may be: Flash, Immediate, Priority and Routine. There can, of course, be only one precedence level to a particular message. The automatic exchange will handle those messages with a higher precedence level before those with a lower precedence level.

Keyboard 10 has a group of switches 15–18 which bear respective indicia A, C, S and T. This group of switches may be referred to as the language media group and they represent the four alternate signals for the language media. For example, T might signify paper tape or teletypewriter and C might signify magnetic tape or punched cards. The actual signal output from the apparatus might consist of a pair of letter code signals for each switch, for example TA, TC, TS and TT. The first letter would be the same indicating the form in which the message originated at the transmitting station, and the second letter would indicate the form in which the receiving station was intended to operate.

Keyboard 10 has a group of switches 20–25 which bear respective indicia R, T, S, C, E and U. For example, these might stand for Restricted, Top Secret, Secret, Confidential, Exclusive and Unclassified. This group of switches represents the six alternate security classifications which a message may have. There can only be one such classification for a particular message.

Keyboard 10 has a group of switches 26–28 which bear respective indicia JAW, JBW and +. These switches 26–28 may be referred to as the content indicator group and they are for generating signals indicating whether the message is a narrative message or whether it is a service message to repeat or correct a previous message for example. Switches 26 and 27 represent content indicators used in the majority of messages. However, there are several other content indicators which are used in infrequently and switch 28 is provided to allow for these. That is, switch 28 is actuated when a content indicator is to be added from equipment external to the apparatus, such as the teletypewriter apparatus used for typing the message text. When switch 28 is actuated it causes the generation of the message format signals to stop at the appropriate place for insertion of the desired content indicator as will be explained in more detail hereinafter.

Keyboard 10 has a number of switches designated generally as switches 30 which bear as indicia the numbers 1 through 80. These are the routing indicator switches. Each switch represents a different addressee, and these may be looked up in an index kept by the apparatus keyboard. The actuation of one of these switches will result in the generation of a code signal representing the letter combination of the addressee. There may be a plurality of routing indicators in a message format, although the system may have a limit, such as 50, to the number that can be handled for one message. It is possible to have the apparatus give a warning if the limit is exceeded.

The four switches 31 are spare routing indicator switches. Each of these switches can, if desired, be used to select the generation of a group of associated routing indicators. The switch 32 which bears the indicia + is one of the group of routing indicator switches and is provided to halt the generation of message format signals to enable routing indicators to be inserted from an external source.

Towards the bottom of keyboard 10 there is a scan switch 33, an error switch 34, a pilot light or reset light 35 and two switches 36 and 37 for reset and unlock functions. The scan switch 33 is a momentary contact switch which does not lock down. The operator depresses switch 33 when he has completed the selection of appropriate format switches on keyboard 10. This switch calls the apparatus to serve this particular keyboard by generating the signals corresponding to the switches depressed on the keyboard. When this switch is depressed a relay circuit locks in an actuated condition and a light within the switch is illuminated to indicate that the keyboard is waiting for action by the central apparatus. The light in switch 33 remains illuminated until some action is taken. The error switch 34 is a momentary contact switch. It is illuminated by testing circuitry when the circuitry detects an error in the number of keys depressed or actuated in each group. When this happens, the operator must locate the error, correct it, depress the error switch to extinguish the light, and then depress the scan switch 33 again. The scan switch 33 will not function while the error switch 34 is illuminated. The reset light 35 is normally illuminated to indicate the apparatus is ready. It is extinguished during the generation of signals to show that the keyboard should not be changed, and it does not light again until a message is finished or alternately if reset switch 36 is depressed as will be explained. The two switches 36 and 37 are momentary contact push-button switches and are not provided with lights. Switches 36 and 37 could, of course, be replaced by a three position rocker switch biased to the central or rest position. Switch 36 is for resetting the keyboard. It is depressed or actuated when an error is detected by the operator after the generation of format signals has started or when the operator desires to stop the generation of format signals for some other reason. The actuation of this switch stops the generation of format signals and releases the signal generating portion of the apparatus from serving that keyboard. The generation of format signals is initiated once more, from the beginning, by depressing the scan switch 33. The unlock switch 37, when depressed or actuated, releases all the switches on the keyboard 10 that are locked in actuated position, and if the format generation is in progress it is stopped, the signal generating portion of the apparatus released, and the keyboard is in an initial cleared condition.

Figure 2:
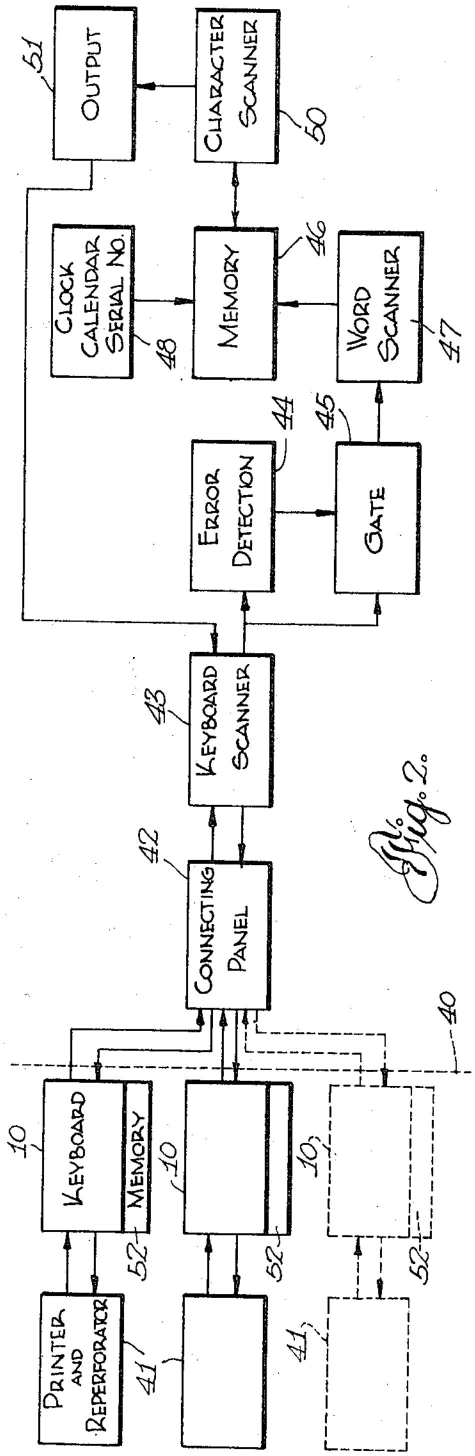
FIG. 2 is a block diagram of an embodiment of the invention.

Referring now to FIG. 2, there is shown to the left of line 40 in the drawing several message preparation positions, each having a keyboard 10 which includes a simple memory 52 to be described later, and associated apparatus such as a page printer and reperforator apparatus represented by block 41. On the right of line 40 in the drawing, there is a programming unit which generates the format signals as required by the keyboards 10.

Each keyboard 10, with its printing and reperforating apparatus, is connected to a single connecting panel 42 by a cable or the like. A keyboard scanner 43 is also connected to panel 42. The operation of a scanner is well known in the art. A scanner may comprise stepping switches or other stepping means which makes connection with a series of circuits in turn and which may locate or pause on a circuit having a desired condition. In the programming unit of FIG. 2, the scanner 43 is started when a scan switch 33 (FIG. 1) in any one of the keyboards 10 is actuated. The scanner 43 scans the connections to each keyboard 10 in turn until it finds a keyboard 10 with its scan switch actuated. The scanner 43 then connects that keyboard with the programming unit until the programming unit finishes serving that particular keyboard.

The keyboard scanner 43 is connected to an error detection circuit 44 and a gate 45. When the scanner 43 completes a connection from keyboard 10 to error detection circuit 44 and gate 45, the gate 45 is at first closed. The error detection circuit 44 checks each group of switches in keyboard 10. That is, circuit 44 checks that one switch has been actuated in each group of switches and that no more than a predetermined number have been actuated in each group. For example, circuit 44 checks that one switch has been actuated in the precedence level group of switches and that no more than one switch has been actuated in that group, circuit 44 checks that one switch has been actuated in the language media group of switches and that no more than one switch has been actuated in that group, and so on. The error detection circuit 44 will provide an output signal if (a) any group of switches does not have at least one switch actuated, and (b) any group of switches with the exception of the routing indicator group has more than one switch actuated. It will also provide an output if there are no routing indicator switches actuated including the plus switch 32 (FIG. 1). The output signal from the error detection circuit 44 illuminates a light in error switch 34 (FIG. 1) on keyboard 10 to indicate to the operator that an error exists, and causes keyboard scanner 43 to release or disconnect from that particular keyboard. The keyboard scanner 43 would then be free, and if another keyboard 10 has an actuated scan switch the keyboard scanner would search for it.

It was previously mentioned that the apparatus might indicate that the number of routing indicator switches actuated exceeded the maximum number for the system. If this is required a counter is included in the error detection circuit 44 to count the routing indicators. When the maximum number has been reached the error detection circuit 44 provides a signal which illuminates the light in error switch 34 (FIG. 1) but does not release the keyboard scanner 43. The apparatus generates the signal pulses required for the message format including the routing indicators in order up to the maximum number of routing indicators, and the error switch light in the keyboard indicates that more than the maximum were selected and not all were generated. The signal generation continues until the end of routing signal is completed as will be described.

If the error detection circuit 44 detects no errors it provides a gate signal to gate 45 which opens gate 45 and extends the connections from the particular keyboard 10 to a word scanner 47 and then to a read-only memory 46. The memory 46 is a store of words, each word being a combination of letters and symbols representing a combination available for selection by actuation of a switch in the keyboard. The words may, for example, be stored in diode matrices.

Connected to memory 46 are a clock, calendar and serial number generator 48 and a character scanner 50. The word scanner 47 scans all the words stored in memory 46 and marks each word which corresponds to an actuated switch on keyboard 10. The clock, calendar and serial number generator 48 makes available to memory 46 a signal representing the digits of current time, the Julian date and the serial number of the station. These appear in all messages. The character scanner 50 scans the words in memory 46, stops at each marked word, and scans the characters in that word. In a preferred form, the actuation of a switch in keyboard 10 provides a ground for that circuit which is connected through the connecting panel 42, scanner 43, gate 45, and scanner 47 to memory 46. Word scanner 47 starts to scan the words in memory 46 and when it comes to a word in memory 46 which is associated with a ground it stops and signals character scanner 50. Scanner 50 then scans or reads out that particular word as a series of pulses and spaces. When it is completed, word scanner 47 continues its scan to the next word having a ground. It will be apparent that scanners 47 and 50 could be combined as a scanning means associated directly with memory 46. That is, there need not be distinct circuitry as suggested by the block diagram of FIG. 2. The scanning continues until the last word in that particular portion of the format. The series of pulses and spaces from scanner 50 is applied to output 51, and output 51 provides corresponding pulses having characteristics suitable for the system. Keyboard scanner 43 still maintains a connection with a particular keyboard 10 and the output is therefore applied to the reperforator associated with that keyboard 10 which perforates a paper tape with the code representing a message format corresponding to the actuated switches. The programming unit is thus responsive to keyboard 10 to generate signals representing a desired message format.

The last signal generated by the programming unit is an end of routing signal, and when this is finished the keyboard scanner 43 is released and the light 33 (FIG. 1) is extinguished to indicate to the operator that the generation of selected format signals has been completed. The light 35 remains out as the message has not yet been completed. Also memory 52, which is part of keyboard 10, is advanced to another condition. This condition of memory 52 is available to the programming unit when required showing that the first phase of signal generation has been completed.

At this time the message text may be typed on associated apparatus and the corresponding code signals recorded in perforations on a tape for future transmission.

When the message text has been completed, the operator actuates the scan switch on keyboard 10. The light in the scan switch will illuminate, the keyboard scanner 43 will search for the keyboard with the actuated scan switch, and will connect that keyboard with the signal generating portion of the apparatus. The keys selected for format generation are still actuated but memory 52 is in a different condition from the starting condition. The error detection circuit 44 recognizes the condition of memory 52, opens gate 45, and the end of message signal is marked in memory 46. The character scanner 50 scans the end of message store in the memory 46 and the correct code pulse signal is provided by output 51 to keyboard 10 and its associated reperforator.

indicators on external apparatus. When scan switch 33 is again depressed, the programming unit will connect to that keyboard and because of the condition of memory 52 will generate the end of routing signal. Again, the memory 52 is advanced and the keyboard scanner 43 is released. If neither switch 28 or 32 is actuated, the generation of the message format signals will continue from the start to the end of routing signal before the keyboard scanner 43 is released, and the memory 52 will, of course, advance the appropriate number of steps to indicate the point at which signal generation is stopped.

It will perhaps provide a better understanding of the invention if an example of a message is given in table form.

| Switch group | Switches available | Switch actuated | Machine output | Explanation |
|---|---|---|---|---|
| Precedence | Z, O, P, R | R | ↓ ↓ ↓ ↓ ↓ ↓ R | The scan switch is pressed to start generation. Six letter shifts or lower case and the precedence symbol for routine are generated. |
| Language media and format. | A, C, S, T | T | TT | The symbol for paper tape or teletypewriter is generated. |
| Classification | R, T, S, C, E, U | U | U> | The unclassified symbol and a space is generated. |
| Content indicator | JAW, JBW, + | JAW | JAW> RUWTAA↑ 1234> 2201915-↓ UUUU↑ --↓ | The following are generated: the symbol for a normal message followed by a space, then automatically originator's number, a figure shift or upper case character shift, the station serial number, a space, the Julian date, the time, a dash, a letter shift or lower case character, a repeat four times of the classification character, a figure shift or an upper case character, two dashes and a letter shift or lower case character. |
| Routing indicators | 80 switches available, each standing for an addressee letter combination. | #17, #+ | RUCCIC | The addressee's letter combination is generated. The plus signifies a typed addition is required and the generation stops. |
| | | (typed)> | RBD1XN | A second addressee's letter symbol not provided on the keyboard 10 is typed. |
| | | | ↑ · ↓ < < ≡ | The scan switch is depressed to have the apparatus generate this end of routihg signal, a figure shift or upper case character, a period, a letter shift or lower case character, two carriage returns, and a line advance. |
| | | | Message text. | Typed from teletypewriter. |
| | | | < < ≡ ≡ ≡ ≡ ≡ ≡ ≡ ≡ N N N N (( (( (( (( (( (( ↓ ↓ ↓ ↓ ↓ ↓ ↓ ↓ ↓ ↓ | The scan switch is depressed to start generation of the end of messeage signal comprising two carriage returns, 8 line advances, four letters N, six blanks and 10 lower case characters. |

When the end of message signal is completed, it is followed by a signal which releases all the actuated switches on that keyboard 10, the light 35 (FIG. 1) is illuminated on that keyboard 10, memory 52 is returned to the starting condition, and the keyboard scanner 43 is released.

Memory 52 may comprise a stepping switch or equivalent circuit. It would have a starting position or condition, a position or condition for the actuation of switch 28 in the content indicator group, a position or condition for the actuation of switch 32 in the routing indicator group, and a position or condition for completion of format generation. In other words, memory 52 remembers the stage in the automatic generation of signals. Suppose switch 28 was one of the actuated switches when the keyboard 10 was set or preselected by the operator. When the operator depresses scan switch 33, and the programming unit connects to that keyboard, signal generation of the message format will proceed as far as the classification symbol and there it will stop. The memory 52 is advanced to a condition representing the actuation of switch 28. The keyboard scanner 43 is not released in this case because the signal required is only three characters. To call the operator's attention that the apparatus is writing, the light in switch 33 flashes and is accompanied by an audible warning. The operator must then type the required content indicator on external apparatus. Then the operator depresses scan switch 33 again. The programming unit continues the signal generation with the format following the content indicator, and memory 52 is advanced. Similarly if switch 32 is actuated, the generation of the message format will proceed until the last routing indicator is generated corresponding to the last actuated routing indicator switch 30, then it will stop. The memory 52 will be in a condition representing actuation of switch 32 and the keyboard scanner 43 is released. The operator then types the required routing It is believed that all the circuitry or apparatus represented by blocks in FIG. 2 is well known and that descriptions of the detail are unnecessary.

The apparatus of this invention generates a message format according to preselected switches making it unnecessary for the operator to select a switch, wait for the generation of a portion of the format, select another switch, and so on. The apparatus of this invention may include several message preparation positions, each served on a time basis by a single programming unit which generates the signals required for each message preparation position.

I claim:

1. In an apparatus for generating a telegraphic signal representing a message format, at least one keyboard having a single first switch, a plurality of groups of second switches with a plurality of switches in each group, at least one group of third switches, and an error indicator, each of said groups of second switches representing a part of a message format and each switch in a group of second switches representing an alternate signal item in that group, said group of third switches representing routing indicator signals, each of said switches having a first condition and a second condition and being manually operable from said first condition to said second condition, a programming unit including a connecting panel having an electrical connection means to each keyboard and the switches therein, and comprising a first scanner for scanning connections to each keyboard and responsive to the operation at one of said keyboards of said first switch to said second condition to make electrical connection to said one of said keyboards, an error detection means electrically connected to said first scanner to make contact with connections to said groups of switches and responsive to any group of said groups of second switches having all switches in said first condition and responsive to any group of said groups of second switches having more than one switch in said second condition to actuate said error indicator on said one of said keyboards and to open said electrical connection to said one of said keyboards, and responsive to all groups in said groups of second switches having only one switch in said second condition to provide a gate signal, a memory including a scanning means, said memory having predetermined locations for storing therein a telegraphic code signal for a respective one of each of said second and third switches, gate means electrically connected between said first scanner and said memory and having an actuating connection with said error detection means, said gate means being responsive to said gate signal from said error detection means to open and extend the electrical connection available at said first scanner from said switches in said groups of switches to said memory, said scanning means being responsive to said gate means being opened to scan in a predetermined order said memory locations and to read out the telegraphic code signals corresponding to respective switches in said groups of switches being in said second condition, and output means connected to receive the signals read from said memory and connected with said one of said keyboards to provide at said keyboard the signals representing a message format.

2. Apparatus for generating a telegraphic signal as defined in claim 1 in which said error detection means is further responsive to said group of third switches having in said second condition a number of switches outside a predetermined range of numbers to actuate said error indicator on said one of said keyboards.

3. In an apparatus for generating a telegraphic signal representing a message format, at least one keyboard having a single first switch, a plurality of groups of second switches with a plurality of switches in each group, at least one group of third switches, and an error indicator, each of said groups of second switches representing a part of a message format and each switch in a group of second switches representing an alternate signal item in that group, said group of third switches representing routing indicator signals, each of said switches having a first condition and a second condition and being manually operable from said first condition to said second condition, a programming unit including a connecting panel having an electrical connection means to each keyboard and the switches therein, and comprising a first scanner for scanning connections to each keyboard and responsive to the operation at one of said keyboards of said first switch to said second condition to make electrical connection to said one of said keyboards, an error detection means electrically connected to said first scanner to make contact with connections to said groups of switches and responsive (a) to any group of said groups of second and third switches having all switches in said first condition to actuate said error indicator on said one of said keyboards and to open the electrical connection to said one of said keyboards, (b) to any group of said group of second switches having more than one switch in said second condition to actuate said error indicator or said one of said keyboards and to open the electrical connection to said one of said keyboards, and (c) to the absence of the actuation of said error indicator to provide a gate signal, a memory having predetermined locations for storing therein a telegraphic code signal for a respective one of each of said second and third switches, a second scanner electrically connected between said gate and said memory to scan said predetermined locations in a predetermined order and to stop at each location corresponding to a respective switch in said groups of switches being in said second condition, a third scanner electrically connected with said memory to scan each memory location at which said second scanner stops and read out the telegraphic code signal stored therein, and output means electrically connected with said third scanner and through said first scanner to said one of said keyboards to receiver said telegraphic code signals from said third scanner and provide it to said one of said keyboards as a telegraphic code signal representing a message format.

4. Apparatus as defined in claim 3 and further including apparatus connected with said memory having available telegraphic code signals representing the time and the Julian date to be read by said third scanner at a predetermined place in the scanning of said memory.

No references cited.

KATHLEEN H. CLAFFY, Primary Examiner

T. J. D'AMICO, Assistant Examiner